March 6, 1951 A. H. MITTAG 2,544,345
MISFIRE INDICATION CIRCUITS FOR RECTIFIERS
Filed Oct. 8, 1947
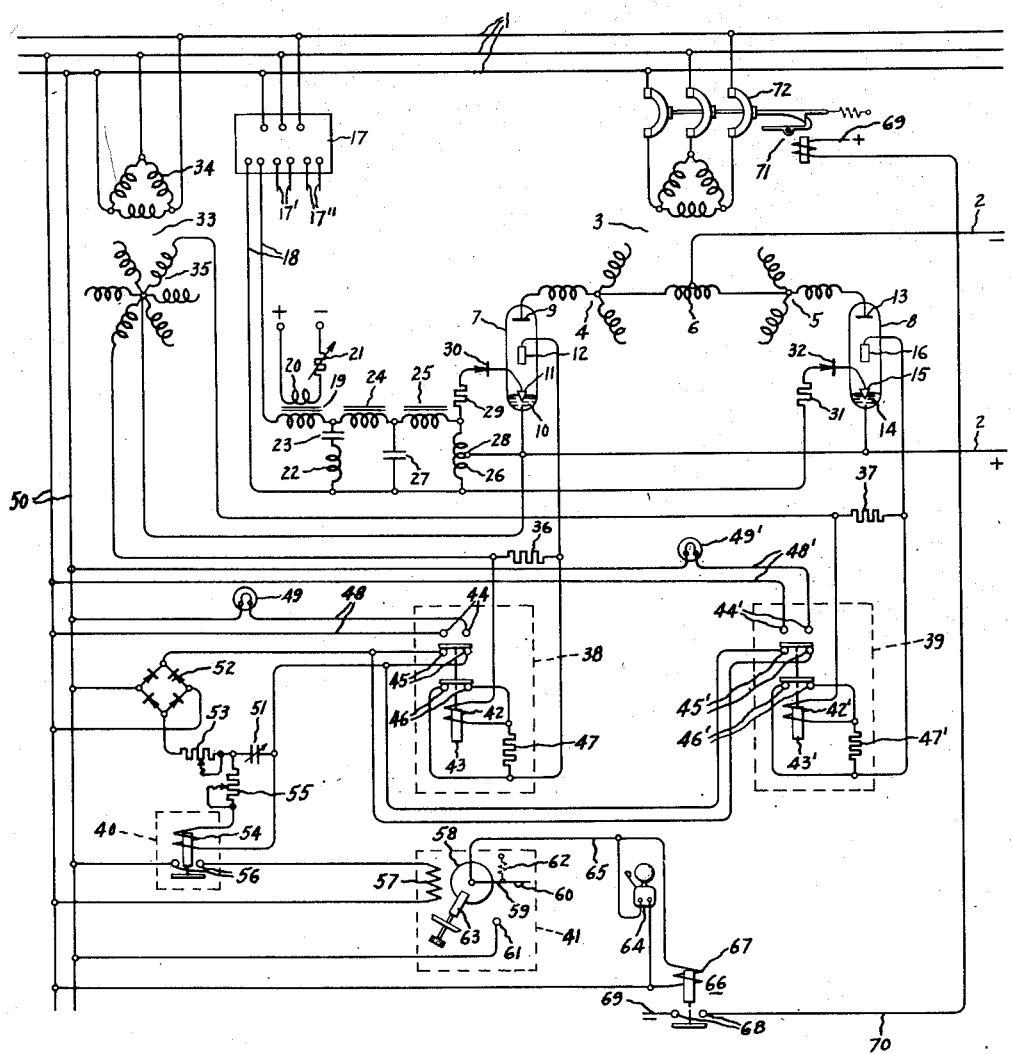
Inventor:
Albert H. Mittag,
by Prowell S. Mack
His Attorney.

Patented Mar. 6, 1951

2,544,345

UNITED STATES PATENT OFFICE 2,544,345

MISFIRE INDICATION CIRCUITS FOR RECTIFIERS

Albert H. Mittag, Schenectady, N. Y., assignor to General Electric Company, a corporation of New York Application October 8, 1947, Serial No. 778,593

9 Claims. (Cl. 321—12)

My invention relates to a control or protective system for a plurality of electric circuits, and more particularly to an excitation-failure control and indicating system for vapor electric discharge devices of the make-alive type.

During the operation of electric discharge devices of the make-alive type, such as the ignitron, one or more anodes may fail to conduct current due to a fault in the ignitor firing circuit, or in one of the ignitors. Failure may be occasional or persistent. Persistent excitation failure or misfire of one anode in a rectifier, where two anodes are operating in parallel, results in increased load being carried by the companion anode with a corresponding increase in arcback probability. Under other circuit conditions misfire of an anode may result in increased duty on one or more of the other anodes with corresponding greater arcback probability and an increase in transformer heating. In any case, an indication of faulty operation is desirable, so that the fault may be remedied and normal operation continued. Various arrangements have been proposed or used heretofore for detecting excitation failures in various types of vapor discharge devices, including tuned relay circuits responsive to an A.-C. ripple voltage in the direct current circuit or in the interphase transformer connection, but such arrangements have not been entirely satisfactory under all conditions of operation, or have not been suitable or adapted for use in all of the many forms of power transformer connections and tube arrangements encountered in practice.

It is an object of my invention to provide a new and improved control system for detecting or indicating current failure in any one of a plurality of circuits, or a series of repeated current failures, or a certain rate of current failures in the group of current circuits.

It is another object of my invention to provide a new and improved protective system for electric valve apparatus which is applicable and suitable for use in a wide variety of power transformer and valve arrangements in electric valve converting apparatus.

It is another object of my invention to provide a new and improved excitation-failure control and indicating system for electric valves of the make-alive type.

In accordance with the illustrated embodiment of my invention, I utilize the action of an auxiliary electrode in each electric valve of a valve converting apparatus as a detector and indicator of misfire in each valve, and provide means for all of the valves of the converting unit to effect indication or control in response to a series of misfires or a certain rate of misfires in the valve group.

My invention will be better understood from the following description taken in connection with the accompanying drawing, and its scope will be pointed out in the appended claims.

The single figure of the accompanying drawing diagrammatically illustrates an embodiment of my invention in an electric valve rectifying system.

Referring now to the drawing, I have illustrated my invention as applied to a conventional and well known rectifier arrangement referred to in the art as a double three-phase or double-Y system interconnecting an alternating current supply circuit 1 and a direct current load circuit 2. The particular form of rectifier arrangement, however, does not impose a limitation on the application of my invention, since its utilization is not dependent upon an interphase transformer and hence it is equally applicable to other arrangements such as the three-phase double-way circuit comprising six valves connected either directly to the alternating current supply circuit or through transformers of various arrangements. As illustrated, the double-Y system comprises a transformer 3 provided with a delta-connected primary winding connected to the A.-C. supply circuit 1 and two groups of Y-connected secondary windings 4 and 5 interconnected through a interphase transformer 6 to operate, in a well known manner, as a double three-phase system. The rectifier also includes a plurality of electric valve means which would be connected, respectively, to the terminals of the respective secondary windings. For purposes of simplifying the drawing, only two electric valves 7 and 8 have been illustrated and these valves are connected to phase terminals of the respective Y groups 4 and 5 so as to be in 180-degree phase relation. The electric valves 7 and 8 are of the type comprising an ionizable medium, such as a gas or vapor capable of supporting an arc discharge, and as illustrated represent a make-alive type known in the art as an ignitron. The electric valve 7 is provided with an anode 9, a mercury pool cathode 10, an immersion ignitor 11 and an auxiliary electrode 12 which may be the usual transfer or relieving anode, or may be any other auxiliary electrode, such as an anode baffle or similar auxiliary electrode dependent upon the establishment of a cathode-spot for current flow in its circuit. The electric valve 8 is similarly provided with an anode 13, a mercury pool cathode 14, an immersion ignitor 15 and an auxiliary electrode 16.

Any suitable ignitor firing circuit may be utilizing such as the type described and claimed in U. S. Patent No. 2,362,294, granted November 7, 1944, upon my application. Each phase of the excitation circuit is arranged to excite two ignitrons whose anode voltages are 180 degrees apart. Excitation power is obtained from a suitable alternating current circuit, such as the circuit 1, through a phase adjusting means 17 having an excitation circuit 18 for the two valves illustrated and excitation circuit terminals 17' and 17" for the remaining groups of valves (not illustrated). The phase adjusting means 17 is employed to bring the supply voltage into the proper relationship with respect to the main anode voltages. The remainder of each phase of the excitation circuit comprises two networks, one which comprises a saturable reactor 19 connected in series relation with circuit 18 and having a direct current winding 20 energized from a D.-C. source through a variable resistor 21, and a linear reactor 22 connected in series with a capacitor 23 across the circuit 18. This phase shifting network provides a convenient means for shifting the firing point of each ignitron and thereby varying the D.-C. voltage output of the rectifier. This network feeds into a second network for generating current impulses which, when fed to the ignitors, causes them to fire. The network for generating current impulses comprises a linear reactor 24 and a symmetrically saturable reactor 25 connected in series relation with an output autotransformer 26 across the first-described network. A firing capacitor 27 is connected across the excitation circuit between reactors 24 and 25. The autotransformer is provided with a midtap 28 which is connected to the cathodes of the rectifier tubes and provides a return path for the ignitor currents, and permits firing of two ignitors which are in 180-degree phase relation from one phase of the excitation circuit. One outer terminal of the autotransformer 26 is connected through a resistor 29 and a contact rectifier 30 to the ignitor 11 of valve 7, while the other outer terminal of the autotransformer 26 is connected through a resistor 31 and a contact rectifier 32 to the ignitor 15 of tube 8. The contact rectifiers 30 and 32 prevent reverse current from flowing through the ignitors.

The auxiliary electrodes or transfer anodes 12 and 16 are connected to be energized from a suitable power supply circuit, such as the circuit 1 or any suitable auxiliary supply bus, through suitable transforming means 33 having a primary winding 34 and a six-phase secondary winding 35 to provide a phase terminal for each auxiliary electrode. The electrode 12 is connected to be energized from winding 35 through an impedance element or current responsive element illustrated as a resistor 36, and the electrode 16 is connected to be energized from a winding of secondary 35, displaced 180 degrees in phase from the phase terminal energizing electrode 12, through an impedance illustrated as a resistor 37.

In accordance with my invention, each valve of the converting unit is provided with a relay and, as illustrated, valve 7 is provided with relay 38, indicated by a dotted rectangle, and valve 8 is provided with relay 39, similarly indicated. The converting unit as a whole is also provided with a second relay 40, indicated by a dotted rectangle, which is controlled in response to the operation of any of the relays 38 and 39 associated with each valve. The relay 40, in turn, is arranged to control a third relay 41 to provide the desired indication and control of a misfire or excitation-failure condition.

The relay 38 is provided with an operating coil 42 for controlling an operating member 43 having three sets of contacts 44, 45 and 46. A resistor 47 is connected in series relation with coil 42 across the electrode resistor 36. In the deenergized position of the relay, contacts 44 are open and contacts 45 and 46 are closed. This is the condition of the relay when the auxiliary anode circuit is not carrying current and, hence, when the cathode-spot fails to form. In this condition or position of relay 38, contacts 46 short circuit resistor 47 and contacts 44 are in the open position, and thereby interrupt a circuit 48 of an indicating means, illustrated as a lamp 49, connected to be energized from a control circuit 50. Contacts 45 are closed and complete an energizing circuit from circuit 50 to capacitor 51, through a rectifier 52 and a resistor 53.

Relay 39 may be a duplicate of relay 38 and the corresponding elements thereof are designated by like reference numerals which have been primed for purposes of distinction. Thus the operating coil 42' is connected across the resistor 37 of the auxiliary electrode 16 of valve 8 in the same manner as coil 42 of relay 38 is connected to resistor 36 of valve 7. In a commercial arrangement, similar relays would be provided for each valve of the converting unit, with the operating coil of each relay connected across the resistor of its associated auxiliary electrode circuit. The contacts 44' control a signal circuit 48' containing the lamp signal 49' connected for energization from the circuit 50. The contacts 45' of relay 39 are connected in parallel with the contacts 45 of relay 38 and, similarly, all of the other corresponding contacts of each valve relay would be connected in parallel relation so that misfire in any valve will effect the operation of relay 40 in the manner set forth in the following paragraph.

The relay 40 is provided with an operating coil 54 connected to be energized from the direct current circuit of rectifier 52 through a resistor 55, and a set of contacts 56 for controlling the relay 41. The capacitor 51 is connected in parallel relation with the operating coil 54 so that relay 40 will stay closed for a much longer period than relay 38 due to the capacitor 51 being charged while contacts 45 of relay 38 are closed and then discharged through coil 54 and resistor 55. The capacitor 51 and resistor 53 and 55 may be made adjustable, or selected with the proper constants, so that relay 40 stays closed for a longer period than relay 38 for a single misfire which may be of the order of 15 cycles if the supply frequency is 60 cycles. The length of time the relay 40 stays closed for a single anode misfire may be changed in accordance with the normal operating conditions of the power circuits and valve arrangements of the particular converter unit to which my invention is applied. The contacts 56 are in the open position or condition when the relay is deenergized. The relay 41 is a time element relay and may be of the induction disk type, such as that illustrated in U. S. Patent No. 1,539,812, granted May 26, 1925, upon an application of Chester I. Hall. This type of relay is well known in the art and is very diagrammatically illustrated as comprising an operating coil 57 connected to be energized from circuit 50 through the contacts 56 of relay 40. The operating coil 57 is arranged to operate an induction disk 58 provided with a contact arm 59 carrying a contact 60 which co-operates with a stationary contact 61. The disk 58 and its arm 59 are biased to an open contact position by any suitable biasing means illustrated as a spring 62 constituting thereby a reset mechanism upon deenergization of operating coil 57. Means are provided in relay 41 for adjusting its time of response, and this means is illustrated, by way of example, as comprising an adjustable magnet 63.

The time element relay 41 is arranged to control a signal of some suitable type, such as an audible signal, indicated by the bell or buzzer 64, connected to be energized across an alarm circuit 65, the energization of which is controlled from circuit 50 through the contacts 60—61 of relay 41. A control circuit may also be connected across the alarm circuit 65, as illustrated by relay 66, which is provided with an operating coil 67 connected to be energized from circuit 65 and control contacts 68. The control contacts 68 are connected in a tripping circuit 70 arranged to be energized from a suitable source 69. The control circuit 70 is arranged to operate a tripping means 71 for a main power circuit breaker 72 interposed between the main rectifier transformer 3 and the main supply circuit 1.

The operation of the illustrated embodiment of my invention is substantially as follows. The relay circuits are all shown in a deenergized position or condition. Since the rectifier arrangement and the firing circuits therefor, and the operation of both, are well understood by those skilled in the art, it is believed sufficient, for the purpose of explaining my present invention, merely to note that with switch 72 closed the rectifier is operating in the well known manner of a double-Y three phase system to provide a direct voltage across the output circuit 2. Upon initiation of the cathode spot in valve 7 by its excitation circuit, a voltage appears across resistor 36 which is sufficient to operate relay 38 to its energized position, and thus close contacts 44 to light signal lamp 49 and open contacts 45 and thereby open the charging circuit for capacitor 51 and also open contacts 46 to remove the short circuit around resistor 47. This may be referred to as the normal-firing position of relay 38 for normal firing conditions in valve 7. The relay 38 is so designed and adjusted that the interval between conduction periods of valve 7 is insufficient to permit relay 38 to drop out. However, the resistor 47, in series with coil 42, is so chosen that a single misfire of the auxiliary electrode 12 will cause relay 38 to drop out. Hence, during normal firing conditions relay 38 stays in a picked-up position and the signal lamp 49 is lighted. However, if the cathode-spot fails to be established and the anode 9 fails to conduct current for a single time in its sequence of firing, the auxiliary electrode 12 likewise fails to conduct current and relay 38 becomes deenergized. Upon deenergization of relay 38 the relay 38 drops out and closes its contacts 45, thereby to close the charging circuit for capacitor 51, and the contacts 46 short circuit resistor 47. The operating coil of relay 40 is thereby energized from capacitor 51 and closes its contacts 56 to energize the operating coil of relay 41. When there is a single misfire, contact 46 of relay 38 stays closed for a fraction of a cycle but relays 40 stays picked up for a much longer period, as for example, 15 cycles, due to the capacitor 51 being charged during the period contacts 46 of relay 38 were closed. The capacitor 51 discharges through coil 54 and resistor 55 of relay 40 to maintain the coil 54 energized for a longer period than the dropout period of relay 38.

The time element relay 41 is so adjusted by its time element adjusting means, represented by magnet 63, that for a single misfire of the auxiliary electrodes the relay does not close its contacts 60—61. Instead, it is adjusted to require a series of misfires or a certain rate of misfires before it closes its contacts. If the assumed excitation failure were a single misfire, the coil 57 of relay 41 would be energized for an interval of time corresponding to the time during which contacts 56 of relay 40 are closed. However, coil 57 would be energized and disk 58 would start to move contact 60 toward engagement with contact 61. Since under the assumed adjustment contacts 60—61 are not closed before relay 40 drops out, relay 41 returns its contact 60 to its deenergized or non-controlling position and no alarm is sounded or control function performed. Since the contacts 45 and 45' of relays 38 and 39 respectively (and the corresponding contacts of the other like relays not shown) are connected in parallel relation, a series of successive misfires in different valves or a series of successive misfires in the same valve will maintain the energizing circuit of relay 40 closed for a sufficient time period so that disk 58 travels to its closed position and closes contacts 60—61, and thereby closes the alarm circuit to alarm 64. At the same time relay 66 would be energized to pick up and close the tripping circuit to trip circuit breaker 72 and disconnect the rectifier from the supply circuit 1.

While I have shown and described a particular embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A control system for a plurality of circuits normally traversed by current comprising, an electric condition responsive element for connection in each of the plurality of circuits, a plurality of substantially instantaneously operating relays arranged one with each of said plurality of electric condition responsive elements, a second relay connected to be operated in accordance with the operation of any one of said first-mentioned relays to a predetermined circuit controlling position, means for maintaining said second relay in its predetermined circuit controlling position for a period of time in excess of a momentary operation of any one of said first-mentioned relays, and an electrically actuated time element relay having a biasing means for returning said relay upon deenergization to a non-controlling position and connected to be energized in response to the operation of said second relay to a circuit controlling position in accordance with the number and duration of the operations of said second relay to its predetermined circuit controlling position.

2. A control system for a plurality of circuits arranged to be traversed by current under normal operating conditions comprising, a current responsive element for connection in each of said plurality of circuits, a plurality of relays arranged one with each of said plurality of circuits and each being connected to be energized in accordance with current flow in the current responsive element of its associated circuit and deenergized upon cessation of current flow in its associated circuit, a second relay connected to be energized upon momentary deenergization of any one of said first relays, means for prolonging the energization of said second relay for a period of time in excess of the time of deenergization of any one of said first relays, and an electrically actuated time element relay having an operating means and a reset mechanism operable upon any deenergization of said operating means to actuate said time element relay to a non-controlling condition and having its operating means connected to be energized for actuation to a circuit controlling condition in response to the rate of occurrence of the periods of energization of said second relay, and electric circuit means connected to be controlled in the circuit controlling condition of said time element relay.

3. A control system for a plurality of circuits to be traversed by current under normal operating conditions comprising, a resistor for connection in each of said plurality of circuits, a plurality of first relays arranged one with each of said resistors and each being connected to be energized or deenergized in accordance with current flow or cessation of current flow in its associated resistor, each of said relays being provided with a plurality of sets of circuit controlling contacts operated to one circuit controlling position upon energization of the relay and a second circuit controlling position upon deenergization of the relay, a second relay having an operating coil and circuit controlling contacts, a direct current circuit connected to said operating coil and including one set of contacts of each of said first relays for causing energization of the operating coil of said second relay in accordance with the second circuit controlling position of any one of said first relays, a capacitor connected in parallel relation with said operating coil for prolonging the energization thereof after interruption of the direct current circuit by said first relays, and a time element relay having an operating coil and a contact means operated by said operating coil upon energization to a circuit controlling position a predetermined time after initiation of such energization, the operating coil of said time element relay being connected in circuit with the circuit controlling contacts of said second relay.

4. A protective system for an electric valve converter of the type having a plurality of make-alive valves wherein each valve is provided with an anode, a cathode, an auxiliary electrode circuit and a make-alive electrode for the cathode which is arranged to be supplied with periodic current impulses for establishing a cathode spot on the cathode comprising, a plurality of electric condition responsive elements arranged one in each auxiliary electrode circuit, a plurality of substantially instantaneously operating relays connected one with each of said plurality of electric condition responsive elements and operative to a predetermined position for each misfire of its associated auxiliary electrode circuit, a second relay connected to be operated in accordance with the operation of any one of said first-mentioned relays to a predetermined circuit controlling position upon operation of any of said first relays to said predetermined position, means for maintaining said second relay in its predetermined circuit controlling position for a period of time greater than the duration of a single misfire of any one of the electric valves, a time element relay connected to be operated to a circuit controlling position by said second relay only after a predetermined number of misfires of the electric valve means, and electroresponsive means operated by said time element relay when it is in its said circuit controlling position.

5. A protective system for an electric valve converter of the type having a plurality of make-alive valves wherein each valve is provided with an anode, a cathode, an auxiliary electrode circuit and a make-alive electrode for the cathode which is arranged to be supplied with periodic current impulses for establishing a cathode spot on the cathode comprising, an impedance element connected in each auxiliary electrode circuit and traversed by current flowing therethrough upon the establishment of a cathode spot on the cathode, a plurality of first relays arranged one with each of said impedance elements and each relay being connected for operation to one controlling position during current flow in its associated impedance element and to a second controlling position upon cessation of current flow in its associated impedance element, a second relay having a circuit closing position and an operating coil connected to be energized upon operation of any one of said first relays to its second controlling position, means connected in circuit with said operating coil for maintaining energization thereof for a period in excess of momentary operation of any one of said first relays to its second controlling position, a time element relay having an operating coil circuit connected to be controlled by said second relay in its circuit closing position, and contact means operated by said operating coil circuit to a circuit controlling position only after a predetermined time of energization of said operating coil circuit, and current responsive means connected to be operated in response to the operation of said time element relay to its circuit controlling position.

6. A protective system for an electric valve converter of the type having a plurality of make-alive valves wherein each valve is provided with an anode, a mercury pool cathode, an auxiliary electrode circuit and a make-alive electrode immersed in said pool cathode and arranged to be supplied with periodic current pulses for establishing a cathode spot on said pool comprising, a resistor connected in each auxiliary electrode circuit and traversed by current only when the cathode spot is established, a plurality of first relays arranged one with each of said resistors, each relay being provided with an operating coil connected to be energized from its associated resistor and two sets of contacts arranged to be opened when current flows through its associated resistor and closed upon cessation of current flow in its associated resistor, a control resistor connected in series with each operatng coil, one of said sets of contacts being connected to short circuit said resistor in the closed position of the contacts, a second relay having an operating coil and a set of circuit controlling contacts, a direct current circuit connected to energize the operating coil of said second relay and including in series circuit relation the second set of corresponding contacts of all of said first relays which are connected in parallel relation, a capacitor connected in parallel relation with the operating coil of said second relay, a time element relay having an operating coil and contact means operated thereby to a circuit closing position only after a predetermined elapsed time from the initiation of energization of the operating coil, the circuit controlling contacts of said second relay being connected in circuit with the operating coil of said time element relay, and current responsive means connected in circuit with the contacts of said time element relay.

7. A protective system for an electric valve converter of the type having a plurality of make-alive valves wherein each valve is provided with an anode, a mercury pool cathode, an auxiliary electrode circuit and a make-alive electrode immersed in said pool cathode and arranged to be supplied with periodic current impulses for establishing a cathode spot on said pool comprising, a resistor connected in each auxiliary electrode circuit and traversed by current only when the cathode spot is established, a plurality of first relays arranged one with each of said resistors, each relay being provided with an operating coil connected to be energized from its associated resistor and three sets of contacts, two sets of which are arranged to be opened when current flows through its associated resistor and closed upon cessation of current flow in its associated resistor while the third set of contacts is arranged for the opposite contact operation, a visual current responsive element being connected in circuit with each of said third set of contacts, a resistor being connected in series relation with each operating coil of said first relays and being connected to one set of said two sets of contacts to short circuit its associated resistor when its associated relay is deenergized, a second relay provided with an operating coil and a set of circuit controlling contacts, a direct current circuit including a rectifier and a control resistor connected to energize the operating coil of said second relay, the other set of said two sets of contacts of each first relay being connected in parallel relation and in series with said direct current circuit so that each first relay can control the energization of said second relay, a capacitor connected in parallel relation with the operating coil of said second relay, means for adjusting the time of duration of closure of said second relay relative to the duration of a momentary cessation of current flow in any one of said plurality of circuits, a time element relay having an operating coil and contact means operated thereby to a circuit closing position only after a predetermined elapsed time from the initiation of energization of the operating coil of said time element relay, and current responsive means connected in circuit with the contact means of said time element relay for causing operation of said current responsive means when said contact means are in a circuit controlling position.

8. A control system for a plurality of circuits arranged to be traversed by current under normal operating conditions comprising, a current responsive element for connection in each of said plurality of circuits, a plurality of relays arranged one with each of said plurality of circuits and each being connected to be energized in accordance with current flow in the current responsive element of its associated circuit and deenergized upon cessation of current flow in its associated circuit, an electrically operated time element relay having a non-controlling position and a circuit controlling position and an operating coil for actuating said relay upon energization to its circuit controlling position and a reset mechanism for actuating said relay upon deenergization to its non-controlling position, and means connected to each of said plurality of relays for effecting energization of said time element relay in response to deenergization of any one of said plurality for a period of time which is a multiple of the time of deenergization of any one of said plurality of relays.

9. A control system for a plurality of circuits arranged to be traversed by current under normal operating conditions comprising, a current responsive element for connection in each of said plurality of circuits, a plurality of relays arranged one with each of said plurality of circuits and each being connected to be energized in accordance with current flow in the current responsive element of its associated circuit and deenergized upon cessation of current flow in its associated circuit, an electrically operated time element relay having a non-controlling position and a circuit controlling position and an operating coil for actuating said relay upon energization to its circuit controlling position and a reset mechanism for actuating said relay upon deenergization to its non-controlling position, means connected to each of said plurality of relays for effecting energization of said time element relay in response to deenergization of any one of said plurality of relays for a period of time which is a multiple of the time of deenergization of any one of said plurality of relays, and means for adjusting the time of response of said last mentioned means to vary the ratio between the time of deenergization of any one of said plurality of relays and the time of energization of said time element relay.

ALBERT H. MITTAG.

REFERENCES CITED

The following references are of record in the file of this patent:

UNITED STATES PATENTS

| Number | Name | Date |
|---|---|---|
| 2,128,162 | Morton et al. | Aug. 23, 1938 |
| 2,158,934 | Griffith | May 16, 1939 |
| 2,325,361 | Bany | July 27, 1943 |
| 2,329,083 | Reagan | Sept. 7, 1943 |
| 2,331,643 | Winograd | Oct. 12, 1943 |
| 2,338,037 | Hoffmann et al. | Dec. 28, 1943 |
| 2,388,072 | Morack | Oct. 30, 1945 |